B. F. Prettyman.
Impd Skate-Sharpener.

Nº 73118      Patented Jan. 7, 1868.

Witnesses
Jnº S Hemingshead
Jnº D. Patten

Inventor
B. F. Prettyman
pr Hillmead & Hemingshead
Attys.

United States Patent Office.

R. F. PRETTYMAN, OF ALEXANDRIA, VIRGINIA.

Letters Patent No. 73,118, dated January 7, 1868.

IMPROVEMENT IN SKATE-SHARPENER.

*The Schedule referred to in these Letters Patent and making part of the same.*

TO ALL WHOM IT MAY CONCERN:

Be it known that I, R. F. PRETTYMAN, of Alexandria, in the county of Alexandria, and State of Virginia, have invented a certain new and useful Improvement in Implements for Sharpening Skate-Irons or any other metallic surfaces where they are required to be grooved or channelled; and I do hereby declare that the following is a full, clear, and exact description of the same, reference being had to the annexed drawings, and to the letters of reference marked thereon, making part of this specification, in which—

Figure 1:
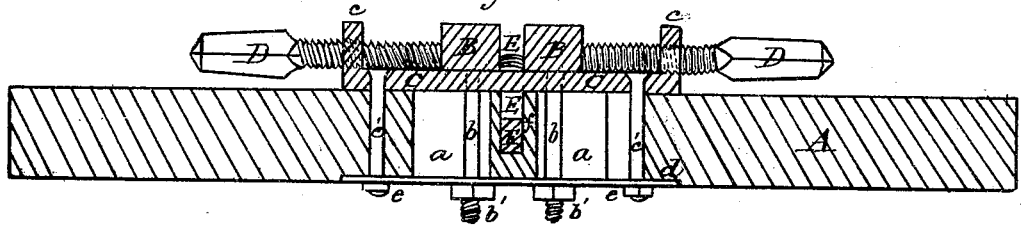
Figure 2:
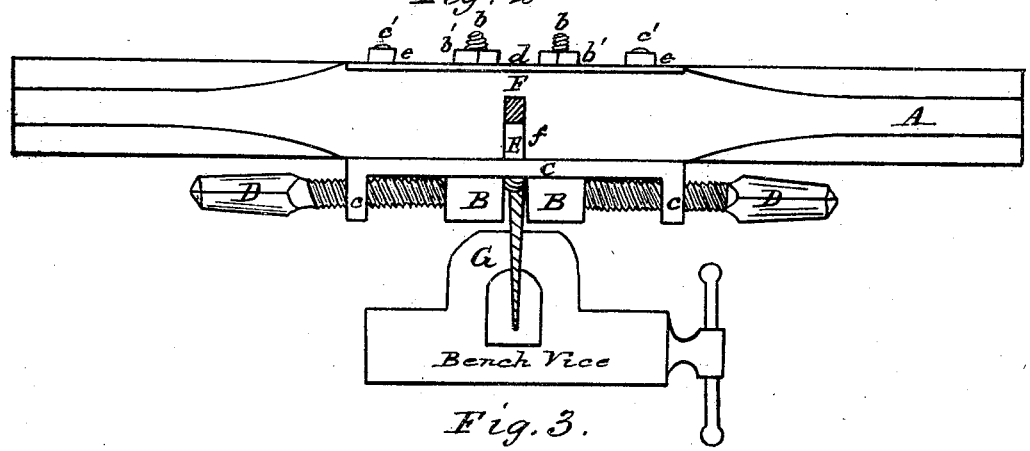
Figure 3:
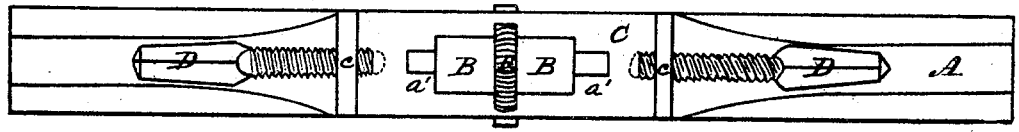
Figure 4:
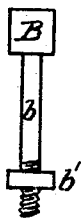
Figure 5:
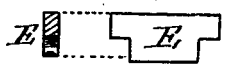
Figure 6:
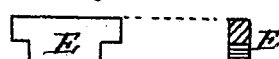
Figure 7:
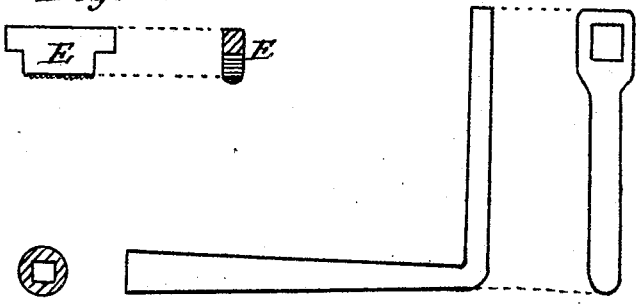

Figure 1 is a longitudinal section.
Figure 2 is a side elevation, showing the position when applied to its use, the iron being in a vise.
Figure 3 is a top or plan view.
Figure 4 is a plan of a bolt.
Figure 5, side and end of a hollow cutter.
Figure 6, side and end of a round cutter.
Figure 7, plan views of wrench.

My improved skate-sharpener consists in arranging in a stock, either of metal or wood, by means of suitable guides or gauges, a file, which is rendered adjustable by means of a key, so that it can be made to readily adapt itself to any depth of cut the runner may require.

In the drawings, A is the stock. B are the guide-blocks, which are square heads of bolts $b\ b$, made fast by nuts $b'\ b'$. C is a plate of metal, covering the whole width of the stock, and turned up into flanches $c\ c$, with threaded holes to suit the screw D. E, the filing-implement. F, the tightening-key. G is the skate-iron, set fast in a bench-vise. $a\ a$ are slots, formed in the stock, and made to correspond with the slots $a'\ a'$ in the metal plate C, and in which the bolts $b\ b$ move freely. $b\ b$, bolts with square heads, B, and nuts, $b'$, for tightening. $c'\ c'$, bolts with countersunk heads through plate C, fastened by nuts $e\ e$ below $d$, a lower plate of same length and width as upper plate C, and through which the bolts pass, acting as a wash-plate for nuts to be tightened on. $f$ is a cross-slot for the file E and wedge F to fit into.

Having described my invention, I will proceed to explain its use.

When the iron is to be sharpened, the same is to be made fast in a vise, or held firmly in any other manner. The tool E is to be adjusted in its appropriate slot $f$ at the distance required, and then the heads B B can be moved to the sides of the object to be filed; and when set the screw D can be run up until the gauge distance is correct, then the nuts $b'$ must be tightened so as to make the guide immovable; the implement is then ready for use, and by the forward and backward motion the desired effect will be accomplished.

Having thus fully described my invention, what I claim therein as new, and desire to secure by Letters Patent, is—

1. The adjustable guides B B, in combination with the adjustable file or cutting-tool E, substantially as described, and for the purpose set forth.

2. The combination of the file or cutting-tool E and key F, when the same are constructed and arranged substantially as described.

In testimony whereof, I have signed my name to this specification in the presence of two subscribing witnesses.

R. F. PRETTYMAN.

Witnesses:
  JOHN D. BLOOR,
  JOHN S. HOLLINGSHEAD.